United States Patent [19]

Jagisch et al.

[11] Patent Number: 4,487,873
[45] Date of Patent: Dec. 11, 1984

[54] AQUEOUS EMULSIONS OF HIGH SOFTENING POINT HYDROCARBON RESINS AND PROCESS FOR PREPARING THE SAME

[75] Inventors: Frank C. Jagisch; Morris L. Evans, both of Baton Rouge, La.

[73] Assignee: Exxon Research & Engineering Co., Florham Park, N.J.

[21] Appl. No.: 526,627

[22] Filed: Aug. 26, 1983

Related U.S. Application Data

[62] Division of Ser. No. 339,647, Jan. 15, 1982, Pat. No. 4,414,346.

[51] Int. Cl.$^3$ .............................................. C08K 5/42
[52] U.S. Cl. .................................. 524/158; 524/375; 524/475; 524/515
[58] Field of Search ...................... 524/158, 375, 475

[56] References Cited

U.S. PATENT DOCUMENTS 2,809,948  10/1957  Hunter et al. ................... 523/336

Primary Examiner—Joseph L. Schofer
Assistant Examiner—Bernard Lipman
Attorney, Agent, or Firm—Roland A. Dexter

[57] ABSTRACT

An aqueous petroleum resin emulsion is realized by the slow addition of part of the water with vigorous agitation to a resin blended with up to 10 weight percent resinplast and in the presence from 3 to 10 weight percent of an emulsifier until inversion and thereafter adding the balance of the water at low agitation and thereafter cooling said emulsion to a temperature at least 20° C. below the softening point of the mixture of emulsifier, resin and resinplast prior to terminating agitation.

3 Claims, No Drawings

AQUEOUS EMULSIONS OF HIGH SOFTENING POINT HYDROCARBON RESINS AND PROCESS FOR PREPARING THE SAME

This is a division of application Ser. No. 339,647 filed Jan. 15, 1982, now U.S. Pat. No. 4,414,346.

This invention relates to emulsions of hydrocarbon resins and more particularly to aqueous emulsions of resins prepared from steam cracked petroleum fractions. It is particularly useful for difficult to emulsify, relatively high softening point, non-polar petroleum resin emulsions.

BACKGROUND OF THE INVENTION

Many synthetic resins which may be formed by emulsion polymerization are well known in the art. It is not difficult to form stable aqueous dispersions of such resins by addition of the resin feed, an appropriate dispersing agent and catalyst to water with stirring. However, emulsification of resins produced by other polymerization techniques requires that the bulk polymer must be dispersed in water to obtain an aqueous dispersion. Such a type is the hydrocarbon resins produced from steam-cracked petroleum fractions.

These hydrocarbon resins, i.e. petroleum resins, are defined herein as the thermoplastic resins obtained by polymerization, in the presence of a catalyst of the Friedel-Crafts type, of steam cracked petroleum distillates, boiling in the range between about 30° C. and 280° C., or any fraction of these distillates boiling within the said range, or of mixtures of olefins and diolefins containing sufficient diolefins to obtain a resin and not an oil. This polymerization is performed at temperatures which range generally from 0° to 70° C., and preferably from 30° C. to 55° C.

These resins are polydienic in character and can have a ring and ball softening point between about 38° C. and 180° C.

Since these resins are solid at room temperature numerous approaches have been utilized to produce aqueous emulsions of said resins for application as an adhesive, as a saturant or coating for paper or cloth or as a sizing or binding material in paper pulp.

One approach was to solvate the resin in hydrocarbon solvent and then combine resin solution and water. Invariably some residual hydrocarbon solvent remains in the finished emulsion, and this is undesirable in certain applications. This has led to the development of solvent-free dispersions (see U.S. Pat. No. 2,809,948) and emulsions (see U.S. Pat. No. 3,377,298) of petroleum resins. In both of these formulations, ionic emulsifiers have been utilized; in the former a mixture of cationic and non-ionic surface active agents is used to achieve a resin dispersion; and, in the latter an ionic surfactant is used in combination with an aqueous gel of a swelling earth to produce an emulsion paste of a petroleum resin.

Petroleum resin emulsions containing substantial amounts of plasticizers or diluents such as linseed oil and waxes and paraffins are taught in French Pat. No. 1,452,875 and German Offen. No. 2014652 respectively. However, such large percentages of diluent can materially modify, not always favorably, the properties of the base resin.

Emulsion pressure sensitive adhesives desirably should be comprised of aqueous emulsions of tackifying resins, i.e. that resin which enhances the adhesive properties of an emulsion polymer system used as an adhesive. It is highly desirable that raw materials added to the tackifier resin emulsion for primarily other than tack or adhesion enhancement, e.g. plasticizers or other diluents, emulsifiers, stabilizers, etc., be kept to an absolute minimum. Such materials often have an adverse effect on the functional properties, e.g. tack, adhesive properties, of the resin being emulsified.

For a general discussion of resin emulsions for emulsion pressure sensitive adhesive use (including its commercial aspects) see the published talk entitled Resin Dispersions for Water Based Pressure Sensitive Adhesives by Robert W. Wherry and presented at The Pressure Sensitive Tape Council Seminar on Water Based PSA Systems in June of 1979.

This invention has for one of its objects the preparation of highly functional, relatively high softening point, non-polar petroleum resin emulsions without the use of volatile solvents and employing minimal plasticizers, diluents or other products constructive in emulsification but potentially deleterious to the emulsion end-use.

A further object is to provide an emulsion preparation method of an inversion type for the aforementioned resins which effectively produces emulsions of small particle size and exceptional stability.

A further object is provision of aqueous dispersions of hydrocarbon resins of high shelf and mechanical stability.

A further object is to provide petroleum resins in the form of a latex-like dispersion for application as a pressure sensitive adhesive, as a saturant or coating for paper or cloth, or as a sizing or binding material in paper pulp.

SUMMARY OF THE INVENTION

It has been discovered that an aqueous emulsion of a petroleum resin having a ring and ball softening point of about 95° C. can be realized when about 45 parts by weight of said resin is melt blended with about 2.5 parts by weight of naphthenic oil and about 2.5 parts by weight of an emulsifier comprised of a polyoxyethylene alkyl aryl ether and an alkyl aryl sulfonate and thereafter admixed with about 50 weight parts of water. The aqueous resin emulsion was made possible by initially slowly adding and dispersing with vigorous agitation boiling water in said melted blend of resin, naphthenic oil and emulsifier over a prescribed critical time length prior to inversion of the dispersion of water.

Thus in accordance with the objects of this invention there is provided an aqueous emulsion of a hydrocarbon resin having a ring and ball softening point of at least 85° C. comprising from 3 to 10 parts by weight of an emulsifier, from 0 to 10 parts by weight of a resinplast and from 80 to 97 parts by weight of said hydrocarbon resin and the balance being water.

This emulsion is realized by admixture of a blend suitable for providing an aqueous emulsion of a hydrocarbon resin having a ring and ball softening point of at least 85° C., comprising from 3 to 10 parts by weight of an emulsifier of the class of nonionic polyoxyethylene alkyl aryl ether, anionic alkyl aryl sulfonates and mixtures thereof blended with a mixture of from 0 to 10 parts by weight of resinplast and 80 to 97 parts by weight of said hydrocarbon resin, said admixture having a ring and ball softening point ranging from 75° C. to 90° C. and a 95° C. melt viscosity ranging from 20,000 to 60,000 centipoises with water through a novel inversion method.

According to the invention there is also taught herein a method for the production of a hydrocarbon resin in water emulsion comprising the sequential steps of admixing from 3 to 10 parts by weight of an emulsifier of the class consisting of nonionic polyoxyethylene alkyl aryl ether, anionic alkyl aryl sulfonate and mixtures thereof with from 80 to 97 parts by weight of a molten hydrocarbon resin having a ball and ring softening point in excess of 85° C. and from 0 to 10 parts by weight of a resinplast, heating said admixture to about 120° C., slowly adding water heated to about 100° C. to said heated admixture with vigorous stirring over a critical minimum period and until inversion occurs, adding sufficient additional water with agitation to provide an aqueous emulsion containing from 30 to 75 weight % water in the finished emulsion and thereafter cooling to a temperature less than about 20° C. below the softening point of the mixture of emulsifier, resin and resinplast prior to terminating agitation.

DETAILED DESCRIPTION OF THE INVENTION

As earlier noted, the hydrocarbon resins emulsified according to this invention are preferably petroleum resins prepared by homo and copolymerization of olefins, diolefins and aromatic components, predominantly C-5 and C-9 species, from distillates of cracked petroleum stocks. A Friedel-Crafts catalyst is typically employed. The resulting resin has an aliphatic, aromatic or mixed aliphatic/aromatic character with a ring and ball softening point above 85° C. The methods described herein can also be used to emulsify lower softening point resins of similar character but it is the higher softening point resins which are more difficult to emulsify and are thus addressed here.

Broadly the hydrocarbon resins are polymerized from petroleum cracked distillates boiling in the range of about 30° C. to 280° C. or any fraction boiling within this range. The resins are prepared by treating the distillate with 0.25–2.5% of a Friedel-Crafts type catalyst such as aluminum chloride, aluminum bromide, boron trifluoride, and the like or solutions, slurries, or complexes thereof. The reactions are conducted at temperatures in the range of 0° to 70° C., and preferably 30° C. to 55° C. Residual catalyst is quenched by suitable methods such as addition of methyl alcohol and subsequent filtration, water and/or caustic washing. The final solution is then stripped of unreacted hydrocarbons and low molecular weight oils by vacuum or steam distillation.

In place of the petroleum cracked distillates, the feed to polymerization may consist of mixtures of a diolefin with an olefin. Sufficient diolefin must be present and incorporated in the polymer to give a resin having a suitably high melting point instead of an oil.

For most resins a resinplast is admixed therewith which in combination with the resin at amounts ranging up to 10% by weight (based on total weight excluding water), preferably at amounts ranging from 3 to 10 percent by weight, adjusts the ball and ring softening point of the admixture to within 75° C. to 90° C. The resinplast includes a wide variety of materials including petroleum oils of the paraffinic, naphthenic and aromatic types, petroleum waxes, petrolatum, low molecular weight polyolefins such as low molecular weight, largely amorphous polyethylenes and similar materials. The resinplast must be compatible with the resin. By reducing the softening point and the melt viscosity of the resin, the resinplast promotes distribution of the water in the molten resin by making the resin softer and less cohesive, and thus more amenable to water addition and formation of small water droplets. Finally, the resinplast acts as a compatibilizer, making the resin more receptive to the emulsifier. An example of a preferred resinplast are naphthenic oils having a viscosity range of from 500 to 2000 SSU (at 100° F.).

The emulsifiers which have been found useful for producing the emulsions of the invention are a combination of a nonionic emulsifier with an anionic emulsifier. The nonionic emulsifier, for example, can be an ethoxylated alkyl phenol in which the alkyl group contains from 8 to 12, preferably about 9 carbon atoms. The molar ratio of ethylene oxide to alkylphenol is selected based on the chemistry of the particular resin. Suitable anionic emulsifiers are the alkyl aryl sulphonates which are generally the alkali metal salts to make them water soluble. Highly useful for the practice of this invention is the sodium or calcium salt of dodecylbenzene sulfonic acid. In total amount as already indicated, the emulsifier ranges in weight from 3% to 10%, preferably 4% to 6%, by weight.

Thus, in summary the non-water portion of the emulsion will have a concentration range of: resin ranging from 80% to 97% by weight; emulsifier ranging from 3% to 10%; resinplast ranging from 0 to 10%. The water content of the finished emulsion will range from 30 to 75 weight %.

Any non-reactive additives may be used in the emulsion of this invention, for example, pigments, dyes and labeling agents.

This invention also contemplates a method for the production of a hydrocarbon solid in water emulsion comprising the sequential steps of admixing, preferably by shearing agitation, from 3 to 10 parts by weight of an emulsifier preferably consisting of nonionic polyoxyethylene alkyl aryl ether, anionic alkyl aryl sulfonate and mixtures thereof, with from 80 to 97 parts by weight of a molten hydrocarbon, preferably petroleum, resin having a ring and ball softening point in excess of 85° C. and from 0 to 10 parts by weight of a resinplast, heating said admixture to about 120° C., slowly adding water heated to about 100° C. to said heated admixtures with vigorous, high shear agitation over a time period, the length of which is critical, until inversion occurs, adding sufficient additional water with agitation to provide an aqueous emulsion containing from 30 to 75 weight % water and thereafter cooling to a temperature less than about 20° C. below the softening point of the mixture of emulsifier, resin and resinplast prior to terminating agitation. Finished emulsion is then typically strained using cheese cloth or a commercial filter bag or filter pack.

As is indicated above, the water is dispersed in the resin admixture to form a water in oil emulsion using vigorous shearing agitation. The impeller design should maximize the portion of the mixing energy dissipation into the emulsion which is classified as shear. Various turbine impellers such as flat blade and disk type flat blade turbines and high shear proprietary design impellers such as the Fawcett mixed flow impeller are suitable.

In the mixing procedure which has been detailed above, there appear to be certain critical aspects to this procedure which are hereinafter indicated. The mixing procedure involves, as indicated, the heating of the resin to a molten state and blending with the resinplast if used. Thereafter the emulsifier is added to the molten resin at a temperature of approximately 105° C. This molten mix must be blended thoroughly to assure homogeneity. During this blending the admixture temperature is increased somewhat after which water at approximately 100° C. is metered into the admixture. Water addition can tend to reduce the temperature of the mixture. It is imperative that the temperature resin above the softening point of the resin-resinplast-emulsifier softening point, typically a minimum of 5° C. to 10° C. above, at all times prior to inversion. Further, impeller rotational speed must be high (e.g. 550-700 rpm in a one liter laboratory unit) to ensure that the molten resin surface is continuously agitated and folded into the mix. During this time a water in oil emulsion is being obtained.

When approximately $\frac{1}{3}$ of the water addition is complete, it is highly desirable to terminate water addition for from 5 to 10 minutes while continuing vigorous agitation. It is essential that the critical time interval from first water addition to inversion be governed by short lapses in water addition in this manner. Such lapses are also useful to maintain mix temperature, the importance of which was emphasized in the paragraph above.

Mention has been made of the criticality of the time interval from first water addition to the point of emulsion inversion from water in oil to oil in water. Laboratory and plant data indicate that for a given resin there is a mix time minimum, below which final resin emulsion particle size will be undesirably large. This critical mix time is dependent upon the power input to the mixture per unit volume of emulsion. Power input is directly related to impeller diameter and impeller rotational speed. This critical time interval can range from approximately 20 to 30 minutes in a small laboratory batch prepared employing the aforementioned very high impeller speeds to 2 plus hours in larger, plant units. It is within the skill of the art to determine the critical time and agitation requirement here for particular cases.

Following inversion it is desirable to reduce the vigorous nature of the stirring to a slow stirring to minimize foam and to terminate batch heating. Water should now be added to the emulsion mix at a temperature materially reduced below boiling and continued until the desired solids level is obtained. The stirring is continued at ambient temperatures for from 5 to 10 minutes after completion of the water addition. Prior to terminating the stirring, the emulsion temperature must be reduced to a temperature of at least 20° C. below the resin-resinplast-emulsifier softening point in order to prevent particle size growth or skin development in the emulsion system.

The aforementioned critical steps are vital to achieve excellent low particle size and the exceptional, unique stability exhibited by these hydrocarbon resin emulsions.

The example set forth below illustrates several embodiments of the invention and are not to be construed as limiting in any manner.

EXAMPLE 1

85 parts by weight of a non-polar, 93° C. softening point petroleum resin, Escorez 2101 sold by Exxon Chemical Americas, Houston, Tex. is heated to a temperature of about 115° C. and admixed with 10 weight parts of naphthenic oil and 5 weight parts of Atlox 3404 F emulsifier sold by ICI Americas Inc. The Atlox 3404 F is reported to be a blend of polyoxyethylene alkyl aryl ether and alkyl aryl sulfonate. The molten resin is blended with the naphthenic oil, then the emulsifier is stirred into the resin-resinplast blend until a complete and thorough blend of all three ingredients is achieved. The resin-resinplast-emulsifier admixed blend is heated at approximately 120° C. at which time the first third of water is metered in at a temperature of approximately 100° C. Actual water addition will exceed $\frac{1}{3}$ to make up for water evaporation. The metering in continues with fast blending speed, i.e. 550-700 rpm, so as to make certain that the resin admixture is continuously agitated and that the water is folded into the mix. The temperature during this initial metering is kept at about 88°-93° C. in order to maintain a viscosity at appropriate levels to facilitate the mixing. When approximately $\frac{1}{3}$ of the water has been added, the system is mixed vigorously for 5 to 10 minutes after which the hot water addition is resumed while maintaining the temperature of the system at about 88°-93° C. Several additional, spaced water addition shutdowns are utilized to prolong mixing and control batch temperature. Hot water continues until inversion occurs at which time the heat supplied to the system is terminated. The balance of the water is added at ambient temperature and the stirrer speed is reduced to minimize foam. Water addition continues with low stirring and upon its completion stirring continues from 5 to 10 minutes. Prior to terminating agitation it is necessary to cool the mixture to approximately 20° C. below to the ring and ball softening point of the mixture of resin-resinplast-emulsifier or to about 60° C. Upon terminating agitation the resin emulsion is passed through a cheese cloth so as to remove any large flakes or dried particles. In a laboratory mix typical times are as follows: resin melting and blending of resinplast and emulsifier—30 to 45 minutes, water addition to the inversion point—20 to 45 minutes, final dilution and cooling—about 15 minutes.

The resulting emulsion is slightly off-white in color, smooth, not gritty to the touch, dries to a very fine powder on the finger tips and will not separate even after months of shelf storage (unagitated). Particle sizes averaging 0.5 micron have been achieved which makes such emulsions excellent components for emulsion adhesives.

EXAMPLE 2

90 parts by weight of a non-polar, 94° C. softening point petroleum resin, Escorez 1310 sold by Exxon Chemical Americas, Houston, Tex., is heated to a temperature of about 115° C. and admixed with 5 weight parts of naphthenic oil and 5 weight parts of Atlox 3404 F emulsifier sold by ICI Americas, Inc. Emulsion preparation procedures follow the same course as in Example 1. The resulting emulsion is white in color but otherwise similar to that in Example 1 in appearance, feel and properties. This emulsion, too, is an excellent component for use in water based adhesives.

As is apparent from the foregoing description, the emulsion preparation procedure has the advantage that does not require either reduction or increase in pressure to achieve the emulsion, i.e. the emulsion can be carried out at normal atmospheric pressure.

It will be apparent from the foregoing that, while predicted forms of the invention have been illustrated and described, various modifications can be made without parting from the spirit and scope of the invention.

Accordingly, it is not intended that the invention be limited except by the appended claims.

What is claimed is:

1. A blend suitable for providing an aqueous emulsion of a hydrocarbon resin having a ring and ball softening point of at least 85° C. consisting essentially of from 3 to 10 parts by weight of an emulsifier blended with a mixture of from 0 to 10 parts by weight of resinplast and 80 to 97 parts by weight of said hydrocarbon resin, said admixture having a ring and ball softening point ranging from 75° C. to 95° C. melt viscosity ranging from 20,000 to 60,000 centipoises.

2. A blend according to claim 1 wherein said emulsifier is present in from 4 to 6 parts by weight and said resinplast is present in an amount ranging from 5 to 10 parts by weight and is a naphthenic oil.

3. A blend according to claim 2 wherein said emulsifier is present in about 5 parts by weight, said naphthenic oil is present in about 5 parts by weight and said resin is a petroleum resin having a softening point of from 90° C. to 95° C. and is present in about 90 parts by weight.

* * * * *